US007797237B2

(12) United States Patent  (10) Patent No.: US 7,797,237 B2
Kim  (45) Date of Patent: Sep. 14, 2010

(54) ELECTRONIC FINANCIAL TRANSACTION SYSTEM AND METHOD PROVIDING REAL-TIME AUTHENTICATION SERVICE THROUGH WIRE/WIRELESS COMMUNICATION NETWORK

(76) Inventor: Min-Suh Kim, A-202, Dongyang Villa, 196-210 Bongchun 11Dong, Kwanak-Gu, 151-061 Seoul (KR)

( * ) Notice: Subject to any disclaimer, the term of this patent is extended or adjusted under 35 U.S.C. 154(b) by 1454 days.

(21) Appl. No.: 10/432,891

(22) PCT Filed: Dec. 6, 2001

(86) PCT No.: PCT/KR01/02109

§ 371 (c)(1),
(2), (4) Date: Nov. 25, 2003

(87) PCT Pub. No.: WO02/46995

PCT Pub. Date: Jun. 13, 2002

(65) Prior Publication Data
US 2004/0068448 A1  Apr. 8, 2004

(30) Foreign Application Priority Data
Dec. 6, 2000 (KR) .............................. 2000-73632
Oct. 26, 2001 (KR) .............................. 2001-66370

(51) Int. Cl.
G06Q 40/00 (2006.01)
(52) U.S. Cl. .............................. 705/40; 705/39; 705/21; 705/24; 705/50; 705/64; 705/77; 713/181; 455/411; 709/204
(58) Field of Classification Search .................. 705/21, 705/24, 50, 40, 39, 64, 77; 713/156
See application file for complete search history.

(56) References Cited

U.S. PATENT DOCUMENTS

| 5,608,778 | A |  | 3/1997 | Partridge, III |
| 5,812,668 | A | * | 9/1998 | Weber .......................... 705/79 |
| 6,394,341 | B1 | * | 5/2002 | Makipaa et al. ............. 235/379 |
| 6,487,540 | B1 | * | 11/2002 | Smith et al. ................... 705/21 |
| 7,240,836 | B2 | * | 7/2007 | Vrotsos et al. ............... 235/439 |
| 7,487,126 | B2 | * | 2/2009 | Kwan .......................... 705/39 |
| 7,668,782 | B1 | * | 2/2010 | Reistad et al. ............... 705/50 |
| 2002/0077993 | A1 | * | 6/2002 | Immonen et al. ............. 705/77 |

(Continued)

FOREIGN PATENT DOCUMENTS

KR  98-29426  7/1998

(Continued)

Primary Examiner—Harish T. Dass
(74) Attorney, Agent, or Firm—Jefferson IP Law, LLP

(57) ABSTRACT

Disclosed herein is an electronic financial transaction system and method providing a real-time authentication service through a wire/wireless communication network that is provided with an electronic slip processing function and a deposit account, so electronic financial transaction users can authenticate electronic financial transactions in real time. The system and method of the present invention is provided with an electronic slip processing function. Accordingly, electronic financial transaction users can authenticate electronic financial transactions in real time using electronic slips without temporal and spatial restrictions, so electronic financial transactions can be safely, conveniently and rapidly carried out Additionally, an approval authority can approve financial transactions in real time without temporal and spatial restrictions, so a multi-approval function through a mobile communication network is provided to prevent a leakage of information and a misappropriation of money.

22 Claims, 16 Drawing Sheets

U.S. PATENT DOCUMENTS

| | | | |
|---|---|---|---|
| 2002/0128977 A1* | 9/2002 | Nambiar et al. | 705/64 |
| 2003/0074555 A1* | 4/2003 | Fahn et al. | 713/156 |
| 2009/0125429 A1* | 5/2009 | Takayama | 705/35 |

FOREIGN PATENT DOCUMENTS

| | | |
|---|---|---|
| KR | 99-78937 | 11/1999 |
| KR | 00/6796 | 2/2000 |
| KR | 00/49360 | 8/2000 |
| WO | WO97/45814 | 12/1997 |

* cited by examiner

FIG.9 enterprise electronic slip input window basic information
1. transaction date [automatic display]
2. transaction time [automatic display]
3. section [selection]
purchase:1/transfer:2/Inquiry:3/others:4 enterprise customer
1. transaction information [automatic display]   2. drawing part [selection]
4. contract No [input]   5. VAT [selection]   (tax:1/tax free:2)   6. item [selection] [direct input others]
7. quantity [selection]   8. price [selection]   9. supply price [automatic display]   10. VAT [automatic display]
11. currency [selection]   (won:1, dollar:2, euro:3, yen:4)   12. other currency [input]

1. drawer [automatic display]
2. ID [input]
3. Password [input]

3. estimate No [input]

[Log-In]

counter part customer information
- counter part customer name [selection] [automatic display]
- counter part customer Code [automatic display]
- counter part customer account No [selection]

fund information
- corresponding account No [selection]
- corresponding account secret number [input]
- balance in current account [automatic display]
- transaction amount(VAT include) [input]
- transfer fee [automatic display]

○ amend  ○ delete   [confirmation(SAND)]

fund information
debit transaction details [automatic display] supply price [automatic display] VAT [automatic display] sum [automatic display]
credit transaction details [automatic display] supply price [automatic display] VAT [automatic display] sum [automatic display]

position and title of an electronic terminal in which money transfer is performed
[automatic display]

do you want to input additional transaction information?   ○ YES  ○ No

Sign-UP
MY Code No [input]   [Sign-UP(SAND)]

reference
address [automatic display]
phone No. [automatic display]   e-mail [automatic display]

ELECTRONIC FINANCIAL TRANSACTION SYSTEM AND METHOD PROVIDING REAL-TIME AUTHENTICATION SERVICE THROUGH WIRE/WIRELESS COMMUNICATION NETWORK

TECHNICAL FIELD

The present invention relates generally to an electronic financial transaction system and method of providing a real-time authentication service through a wire/wireless communication network, and more particularly to an electronic financial transaction system and method of providing a real-time authentication service through a wire/wireless communication network, which can manage accounts integratively on the Internet using a communication system employing the wire/wireless communication network, select a required account to perform a safe financial transaction using an electronic slip connected with a mobile communication system in financial transaction, especially for enterprises, prevent the leakage of information, fund diversion and misappropriation occurring in an account transfer, carry out a mutually reliable transaction using a deposit account by the electronic slip in electronic commerce, increase the transaction security by directly executing an authentication process and allow convenient and safe payment by an electronic commerce user or a manager through the wire/wireless communication network.

BACKGROUND ART

Generally, Internet banking is a service for realizing financial services through the Internet. Users can be provided with conventional Internet banking services after they apply to a corresponding bank for an Internet banking service, receive safety cards, access the Internet banking site of the corresponding bank, register as members and are authenticated with their safety cards. Further, users can be provided with each financial service by accessing a corresponding Internet banking site with respect to all established accounts using a similar process.

In conventional electronic commerce, the user pays for a commodity using a required account number at a corresponding electronic commerce site and then receives the commodity.

In this case, there are three kinds of payment methods, as fellows: first, a user can visit a bank and transfer money online, second, the user can transfer money using a cash dispenser, and third, the user can transfer money by accessing a favorable Internet banking site to transfer money using an Internet banking service.

Further, in order to pay for purchased products and various services such as traveling, lodging and restaurant services, the user can typically pay in cash or by a credit card.

The payment by a credit card can be used only in credit card affiliated stores, wherein the user can freely use the credit card within his credit limit, and the used money is paid together with a charge on a preset payment day.

The above conventional methods are problematic in that, since users must access the corresponding bank site to use the Internet banking service per established account, if there are many established accounts, it is very inconvenient, and a security problem of the Internet hacking, which frequently occurs, is not solved yet.

Further, when enterprises transfer money using the Internet banking service, since they have no internal control system for real-time money flow, money diversion and misappropriation by an accountant cannot be prevented.

Moreover, in the prior art, since a commodity purchaser confirms a delivered commodity after paying for the commodity in advance in electronic commerce, the purchaser cannot be guaranteed of the quality of the commodity, and his interest in Internet shopping decreases.

Finally, conventional payment methods are inconvenient in that users must carry cash providing against payment for transactions in affiliated stores, financial losses may occur due to the leakage of personal credit information of the user in paying by a credit card, and the payment is accomplished not in a timely manner but after a predetermined period of time elapses.

DISCLOSURE OF THE INVENTION

Accordingly, the present invention has been made keeping in mind the above problems occurring in the prior art, and an object of the present invention is to provide an electronic financial transaction method of providing a real-time authentication service through a wire/wireless communication network, which can manage accounts integratively through the Internet using a wire/wireless communication network, select a required account to perform a safe and convenient electronic financial transaction for authenticating the user in real time using an electronic slip connected with a mobile communication system in the electronic financial transaction, for enterprises, prevent the leakage of information and fund diversion or misappropriation by using the electronic slip for confirming fund flow information in real time in an account transfer, carry out a mutually reliable transaction using a deposit account for processing the electronic slip in real time in electronic commerce, perform convenient and safe payment in real time between the user and an affiliated store owner using the electronic slip when the user pays in affiliated stores.

Another object of the present invention is to provide an electronic financial transaction system for providing a real-time authentication service through a wire/wireless communication network, in which an electronic financial transaction device which requests an electronic financial transaction and an electronic financial transaction approval using a mobile communication terminal, transmits an electronic slip to the mobile communication terminal by an electronic slip processor connected to a mobile communication network, and receives a payment-approved electronic slip from the mobile communication terminal to confirm the payment approval, integratively manages the electronic slip processor, members and their accounts, transmits member and electronic financial transaction request information including a telephone number of an electronic financial transaction user's mobile communication terminal to the electronic slip processor in response to the at least one electronic financial transaction request of the electronic financial transaction users, and executes the requested electronic financial transaction in response to the confirmation of a payment approval received from the electronic slip processor.

In order to accomplish the above object, the present invention provides An electronic financial transaction system for providing a real-time authentication service through a wire/wireless communication network, comprising a mobile communication terminal for requesting an electronic financial transaction and an electronic financial transaction approval; an electronic slip processor connected to a mobile communication network for transmitting an electronic slip to the mobile communication terminal and receiving a payment-approved electronic slip from the mobile communication terminal to confirm a payment approval; and at least one integrated account electronic financial transaction device for integratively managing members and their accounts, transmitting member and electronic financial transaction request information including a telephone number of an electronic financial transaction user's mobile communication terminal to the electronic slip processor in response to the at least one electronic financial transaction request of electronic financial transaction users, and executing the requested electronic financial transaction in response to the confirmation of the payment approval received from the electronic slip processor, such that the security and authentication can be performed by using a system for managing an integrated account established through the Internet, generating an electronic slip in the electronic slip processor, and sending the electronic slip in real time to a user's mobile communication system in the electronic financial transaction.

The present invention is characterized in that it comprises the steps of:

transmitting an electronic slip to a mobile communication system of concerned enterprise manager in authority by an integrated account electronic financial transaction device when an account transfer is required;

approving by the enterprise manager the account transfer to the integrated account electronic financial transaction device on the basis of the electronic slip; and performing the account transfer by inputting an electronic slip number by a person in charge, thus preventing information leakage and fund diversion or misappropriation from occurring in money transfer between accounts in enterprises.

Further, the present invention is characterized in that it comprises the steps of:

depositing money for payment from a user's real account to a deposit account by the integrated account electronic financial transaction device when the user pays for the commodity after purchasing a commodity in electronic commerce;

delivering the commodity to the user through a home delivery service provider by an electronic commerce service provider informed of the deposit results, and confirming the delivery receipt of the commodity by the delivery service provider using his mobile communication terminal; and paying for the commodity by transferring money deposited in the deposit account to the real account of the electronic commerce service provider after the delivery receipt of the commodity is confirmed by the delivery service provider, thus enabling mutually reliable transactions to be carried out.

Further, the present invention is characterized in that it comprises the steps of:

inputting a payment account of established accounts of a user, the payment amount and an affiliated store code number or an affiliated store account using the user's mobile communication system, when the user pays for a commodity or service fee in an affiliated store subscribed to an integrated account electronic financial transaction service;

generating an electronic slip by an electronic slip processor and simultaneously transmitting the electronic slip to communication systems of both the user and the affiliated store owner;

approving the electronic slip through the communication terminal of the user or the affiliated store owner by the user;

transmitting the approved electronic slip to an integrated account electronic financial transaction device by the affiliated store; and confirming the approved electronic slip by the integrated account electronic financial transaction device, and transferring approved transaction amount from a user's account to the affiliated store owner's account, thereby guaranteeing mutually reliable and safe transactions.

Here, when the user pays by his credit card, a process of a credit card payment is executed after only a user authentication by the electronic slip is performed.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a schematic view showing an input window for generating an electronic slip for an enterprise according to a preferred embodiment of this invention.

DESCRIPTION OF MAIN COMPONENTS IN DRAWINGS

Figure 1:
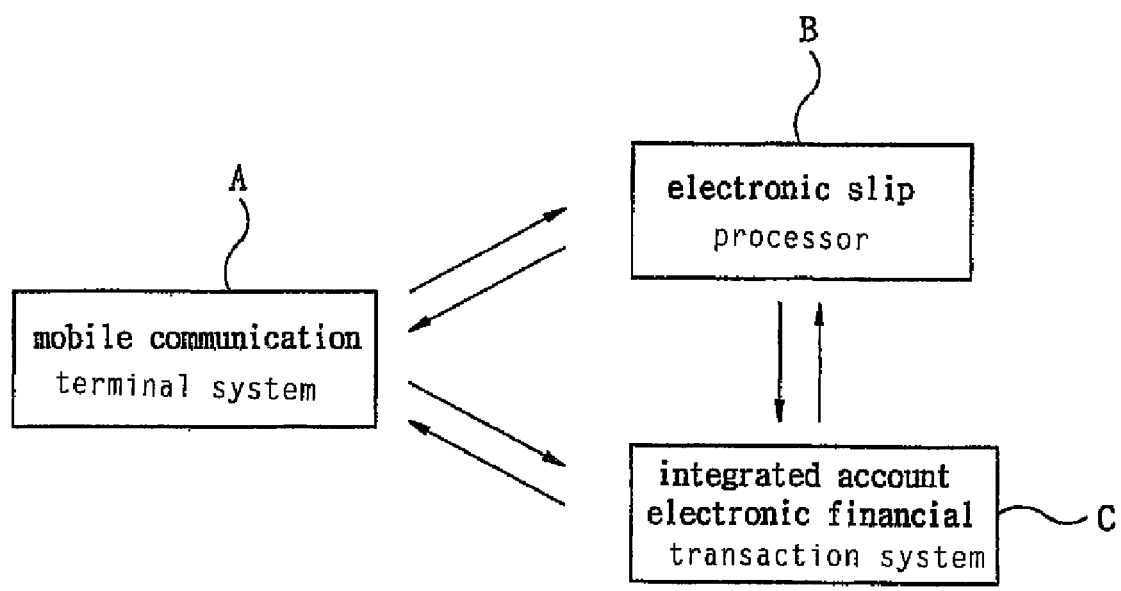
FIG. 1 is a schematic diagram showing an entire configuration supporting an integrated account electronic financial transaction service of the present invention.

1: web server
2: user managing server
3: affiliated store managing server
4: financial communication server
5: deposit account managing server
6: WAP server (ARS server)
11: electronic slip managing server
12: communication server
21: mobile communication service provider

BEST MODE FOR CARRYING OUT THE INVENTION

FIG. 1 is a schematic diagram showing an entire system configuration for an integrated account electronic financial transaction service through the Internet.

The system comprises:

a mobile communication terminal system A comprising a user's mobile communication terminal for requesting an electronic financial transaction and approving the electronic financial transaction;

an electronic slip processor B for transmitting an electronic slip to the mobile communication terminal system A and receiving a payment-approved electronic slip from the mobile communication terminal system A to confirm the payment approval during the transmission/reception through a mobile communication network; and an integrated account electronic financial transaction system C for integratively managing members and their accounts, transmitting member and electronic financial transaction request information including a telephone number of the mobile communication terminal of the user who requests the electronic financial transaction to the electronic slip processor B in response to at least one electronic financial transaction request of electronic financial transaction users, and executing the requested electronic financial transaction in response to the payment approval confirmation from the electronic slip processor B.

Figure 2:
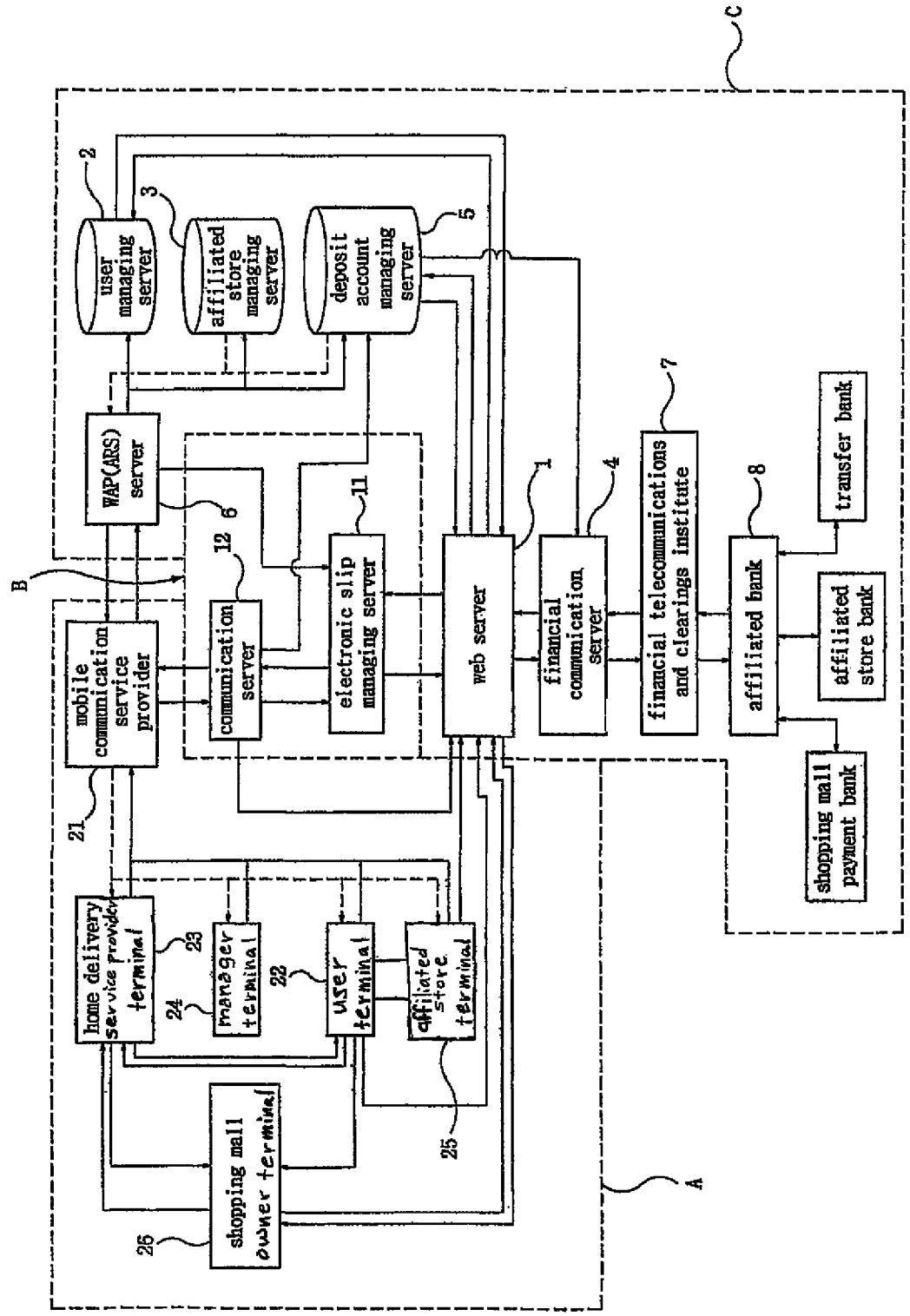
FIG. 2 is a block diagram of an entire system for providing the integrated account electronic financial transaction service of this invention.

FIG. 2 is a block diagram showing the detailed configuration of the system for providing the integrated account electronic financial transaction service of this invention;

The integrated account electronic financial transaction system C includes:

a Web server 1 for controlling the operation of the integrated account electronic financial transaction system so as to provide the integrated account electronic financial transaction service to users who access the Web server 1 through the Internet and register as members;

a user managing server 2 for managing the users to confirm which user accesses the Web server 1 in log on, and determine whether or not the service is provided, while managing the users accessing the Web server 1 through the Internet;

an affiliated store managing server 3 for managing data of affiliated stores as members which desire to provide the integrated account electronic financial transaction service allowing the users to pay when the users want to pay using their communication systems;

a financial communication server 4 for finding a bank corresponding to an established account of the user when an electronic financial transaction is generated, and requesting the electronic financial transaction;

a deposit account managing server 5 for depositing and managing payment amount until the user, who is a purchaser in the electronic commerce, confirms a commodity;

wireless application protocol (WAP) servers (or ARS servers) 6 through which a home delivery service provider accesses the integrated account managing service and managing a confirmation procedure so as to confirm that a purchased commodity is delivered to the user through the home delivery service provider.

The financial communication server 4 is connected to a financial telecommunications and clearings institute 7, thereby enabling the payment to be performed through affiliated banks 8, such as a shopping mall payment bank, an affiliated store bank and a transfer bank, and/or credit card companies.

The electronic slip processor B includes:

an electronic slip managing server 11 for generating an electronic slip and an electronic slip number using the identification (ID) and the password of the user when the user is desirous of the electronic financial transaction; and communication server 12 connected to mobile communication service provider 21 for transmitting the electronic slip generated by the electronic slip managing server 11 to the communication system of the user.

The mobile communication terminal system A includes a mobile communication terminal 23 of the home delivery service provider, who subscribes to a plurality of mobile communication service providers 21 individually and delivers commodities, a mobile communication terminal 22 of the user who registers as a member and purchases a commodity or requests a financial transaction, a mobile communication terminal 24 of the manager who approves the financial transaction of an accountant managing settlements, and a mobile communication terminal 25 managed by the owner of the affiliated store, who sells commodities.

Further, a shopping mall owner, who subscribes to the Web server 1 as a member and sells commodities through a television and an Internet site, can be provided with the integrated account electronic financial transaction service under the same condition as the affiliated store 25. The mobile communication terminal system A may comprise a mobile communication terminal 26 managed by the shopping mall owner.

Figure 3:
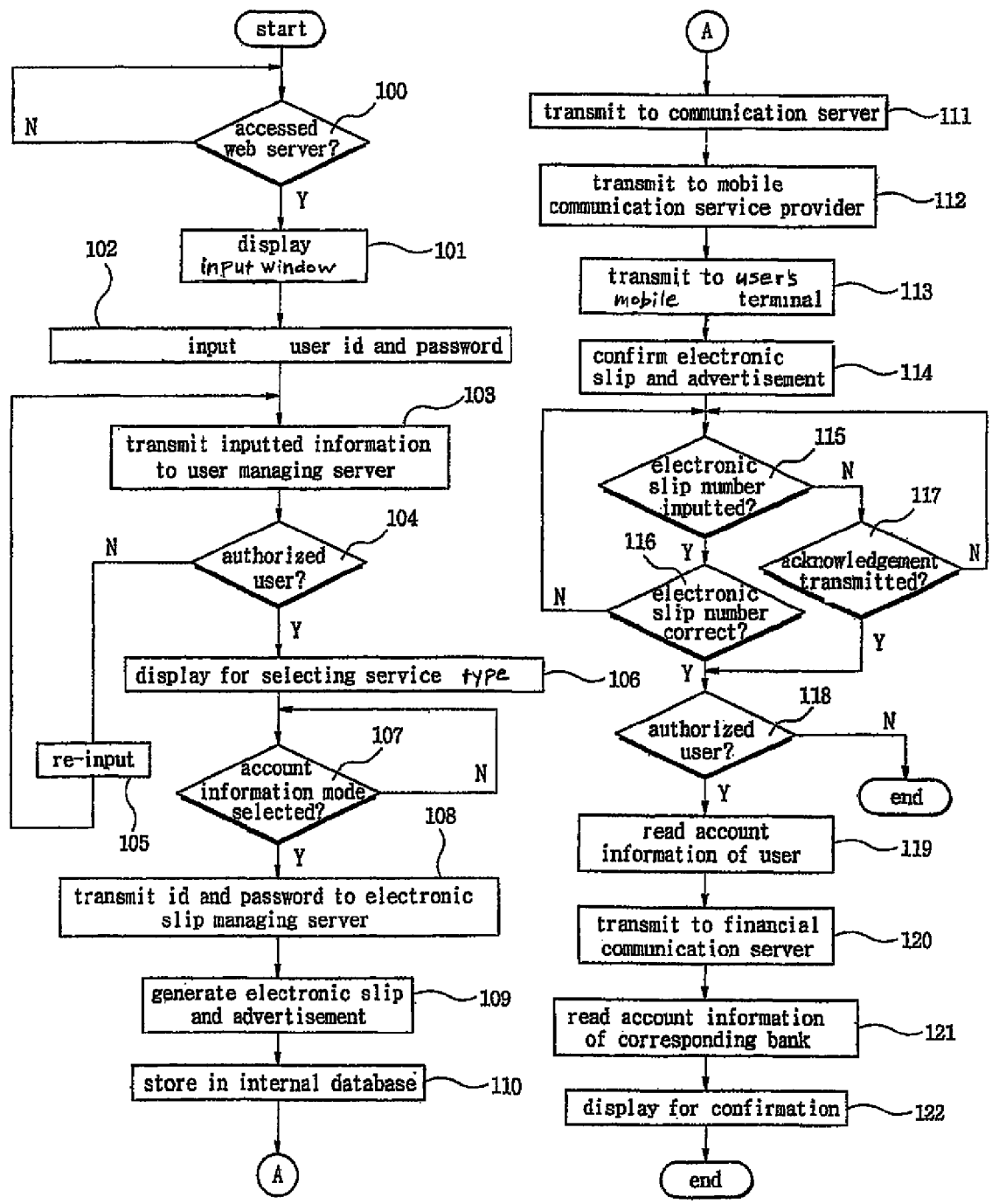
FIG. 3 is a flowchart of a process of outputting account information using the integrated account electronic financial transaction service of this invention.

FIG. 3 is a flowchart of a process of confirming the account information by the user.

Figure 8:
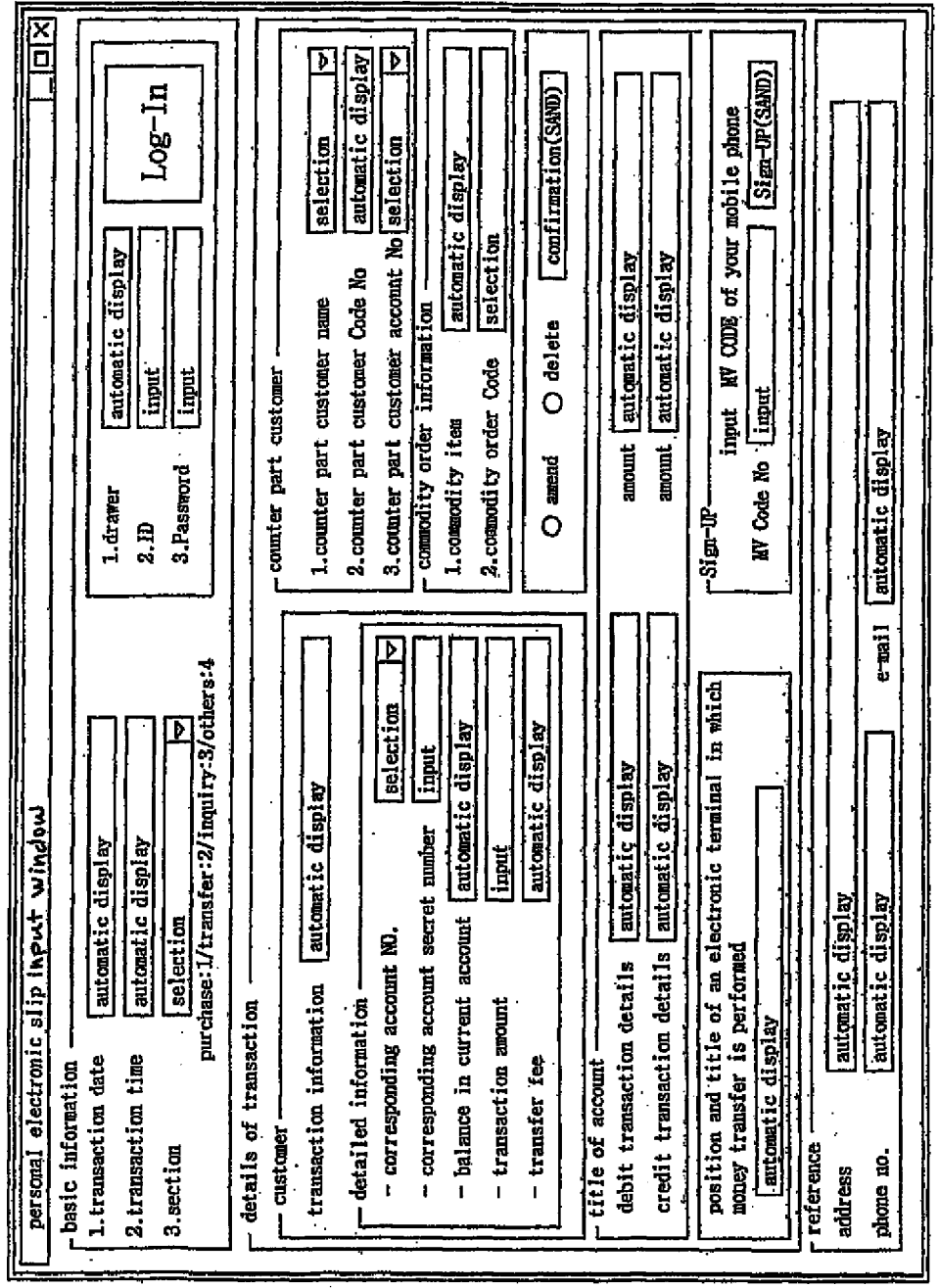
FIG. 8 is a schematic view showing an input window for generating an electronic slip for a person according to a preferred embodiment of this invention.

First, at step 100, the user accesses the Web server 1 to inquire about account, and if the user selects the website of an integrated account electronic financial transaction system, an input window is displayed at step 101. At this time, the user inputs information including his ID and password into the input window at step 102. The input window is shown in FIG. 8, and the information input into the input window will be used to generate a personal electronic slip.

The Web server 1 which controls the integrated account electronic financial transaction transmits the ID and password input by the user in the input window to the user managing server 2 at step 103, and the user managing server 2 determines whether the user is an authorized user at step 104. If the user is not an authorized user, the user managing server 2 makes the user confirm and input the ID and password again at step 105. On the other hand, if it is determined that the user is an authorized user, the user selects and inputs a type of service at step 106.

If, at step 107, the user selects and inputs an account information mode as the type of service, in order to inquire about account information, the Web server 1 transmits the user-inputted information including the ID and password to the electronic slip managing server 11 at step 108.

The electronic slip managing server 11 generates an electronic slip to which an electronic slip number is assigned and an advertisement using an embodied algorithm at step 109. The electronic slip with the electronic slip number is stored in a database within the server 11 at step 110, and is transmitted to the communication server 12 together with the telephone number of the user's mobile communication terminal 22 at step 111.

The communication server 12 transmits the electronic slip and the telephone number of the user's mobile communication terminal 22 to the mobile communication service provider 21 at step 112, and the mobile communication service provider 21 sends the electronic slip information to the user's mobile communication terminal 22 using a short message service (SMS) a step 113.

After the user confirms the contents of the received electronic slip and the advertisement at step 114, it is determined whether the user inputs the electronic slip number to the input field for the electronic slip number displayed on the website of the integrated account electronic financial transaction Web server 1 at step 115, and if so, it is then determined whether the electronic slip number inputted by the user is correct at step 116.

If the user does not input the electronic slip number, then at step 117, it is confirmed whether acknowledgement, which is a response method using WAP of the communication network, has been transmitted. If it is determined at step 117 that the acknowledgement has been transmitted, or if the input electronic transaction form number is correct (step 116), then it is confirmed whether the user is an authorized user at step 118.

The Web server 1 reads the account information of the user from the user managing server 2 at step 119, and transmits the account information to the financial communication server 4 at step 120, such that the financial communication server 4 reads the account information from a corresponding bank at step 121.

The Web server 1 receiving the account information of the user displays the information to allow the user to confirm it at step 122.

Figure 4A:
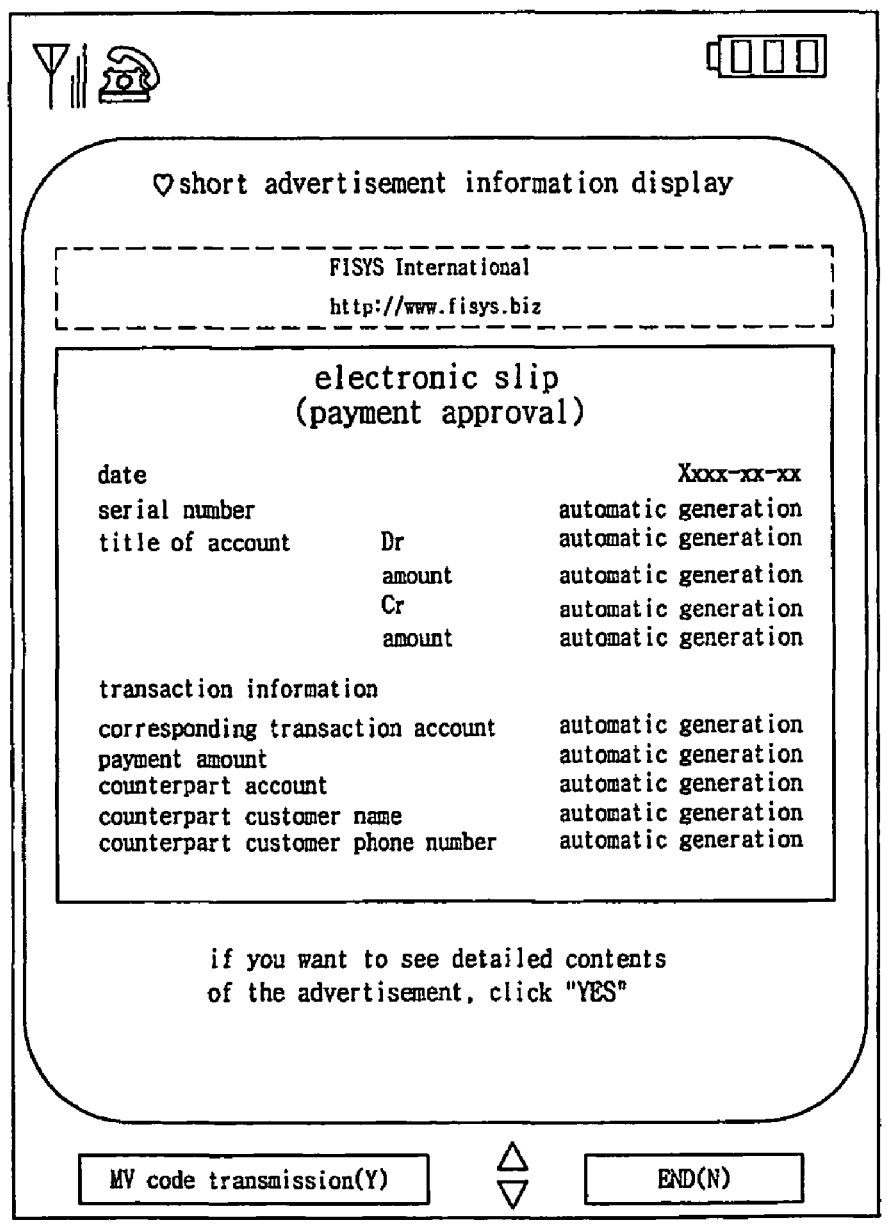
FIGS. 4a to 4e are views showing electronic slips according to a preferred embodiment of this invention.
Figure 4B:
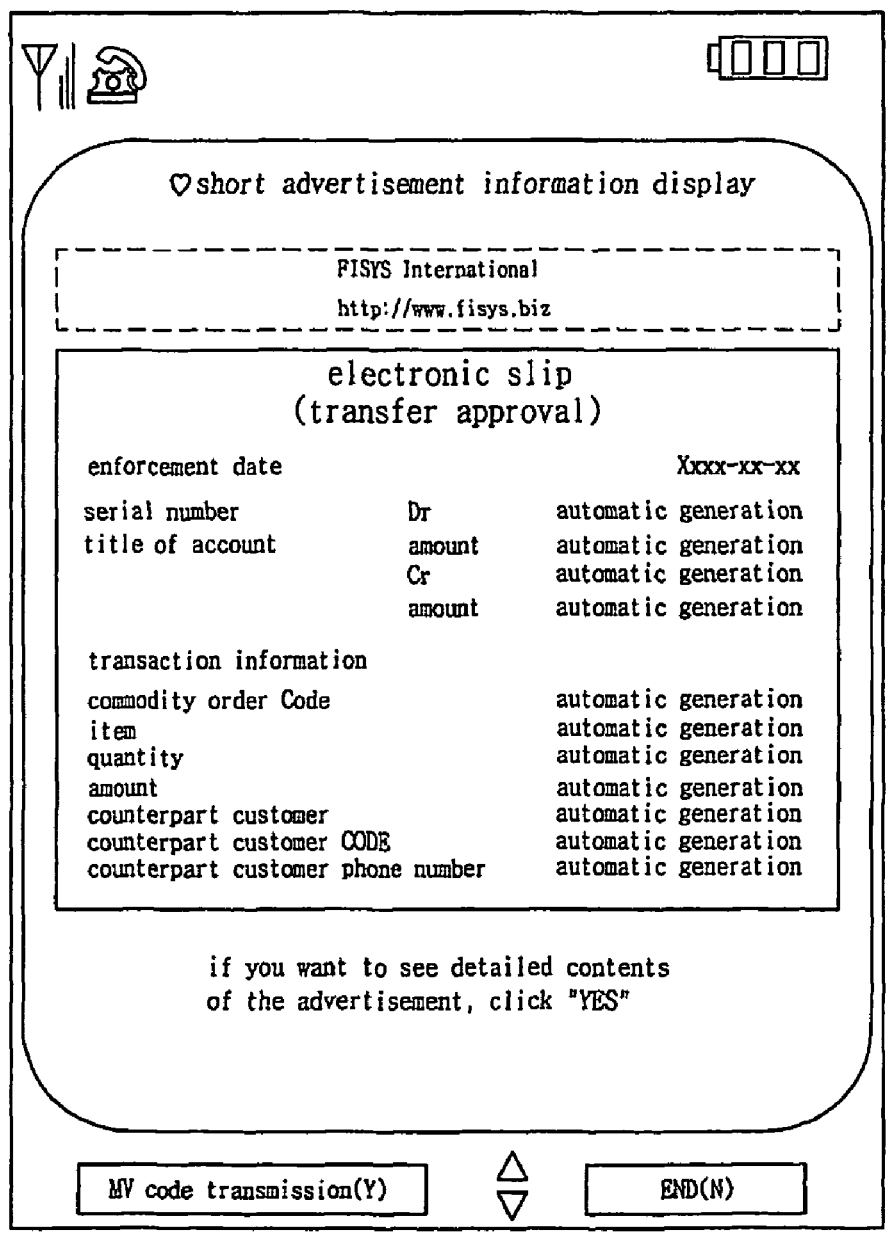

If the user confirms the electronic slip and advertisement using the short message service at step 114, first the contents of the electronic slip are displayed on the screen, and after confirming the contents of the electronic slip including the advertisement, the user can see the advertisement according to the guide such as "Click 'yes' if you want to see details of the advertisement" displayed at a lower portion of the electronic slip, as shown in FIGS. 4a and 4b.

Figure 4C:
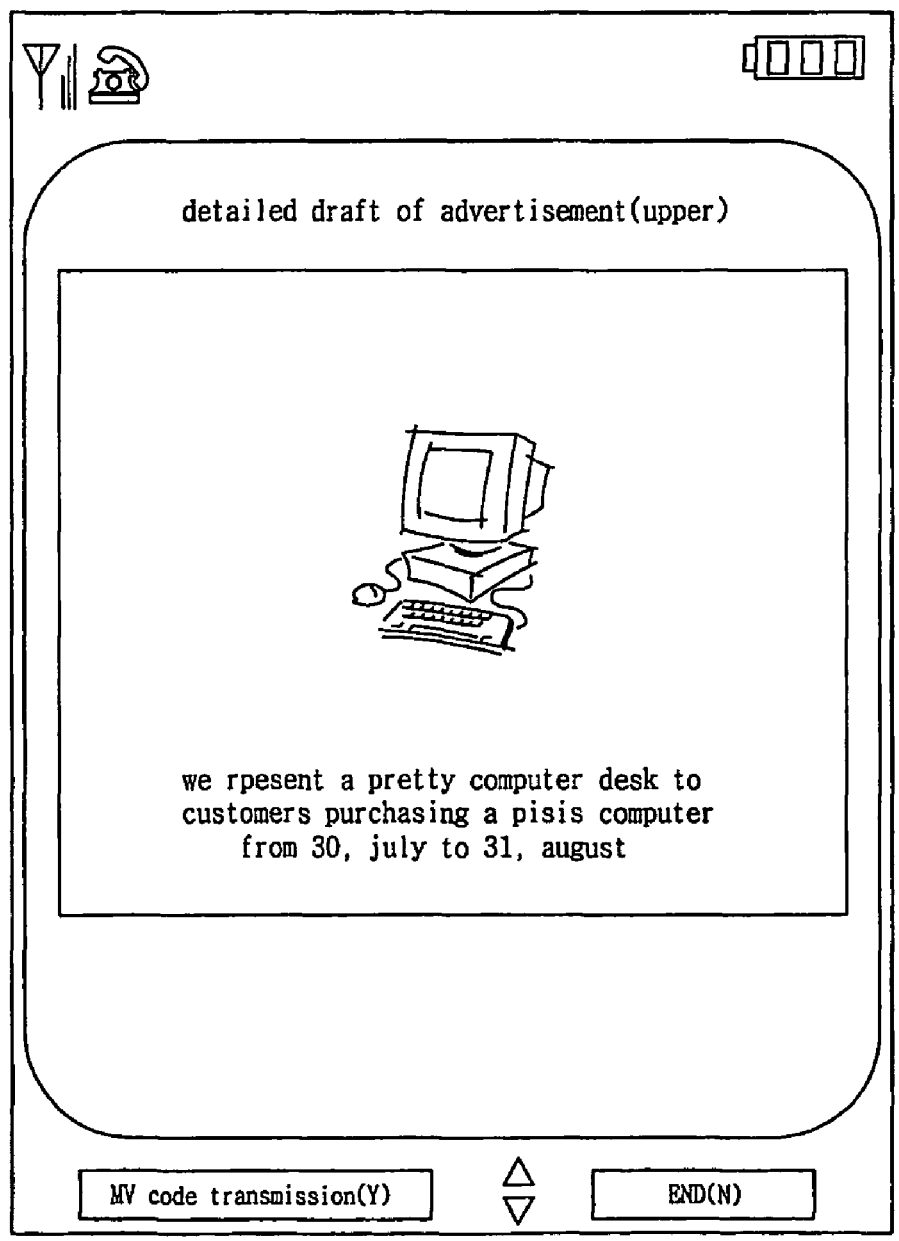
Figure 4D:
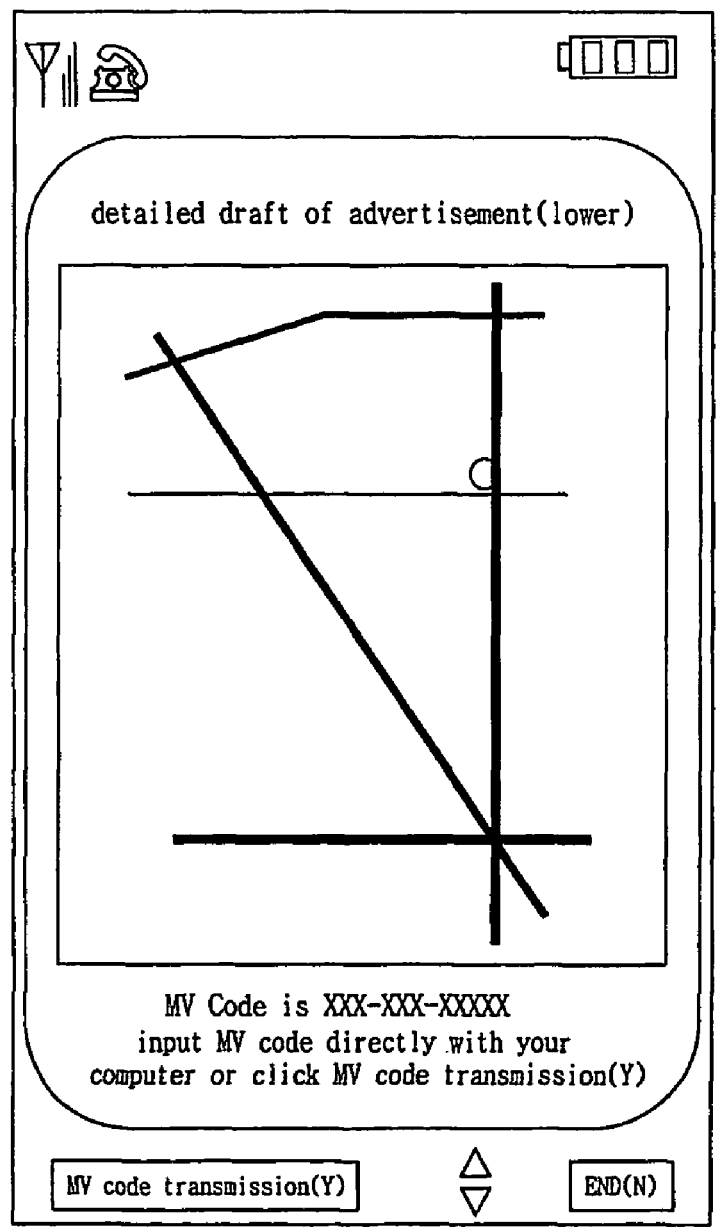

Further, if the user selects a "yes" field and activates the advertisement using the WAP to see the advertisement, details of the advertisement are displayed using characters and images, as shown in FIG. 4c. Moreover, a schematic map or details of the advertisement can be displayed at the lower portion of the electronic slip, as shown in FIG. 4d. Therefore, the user can simply see the advertisement while clicking up/down fields using buttons of the mobile communication terminal.

Figure 4E:
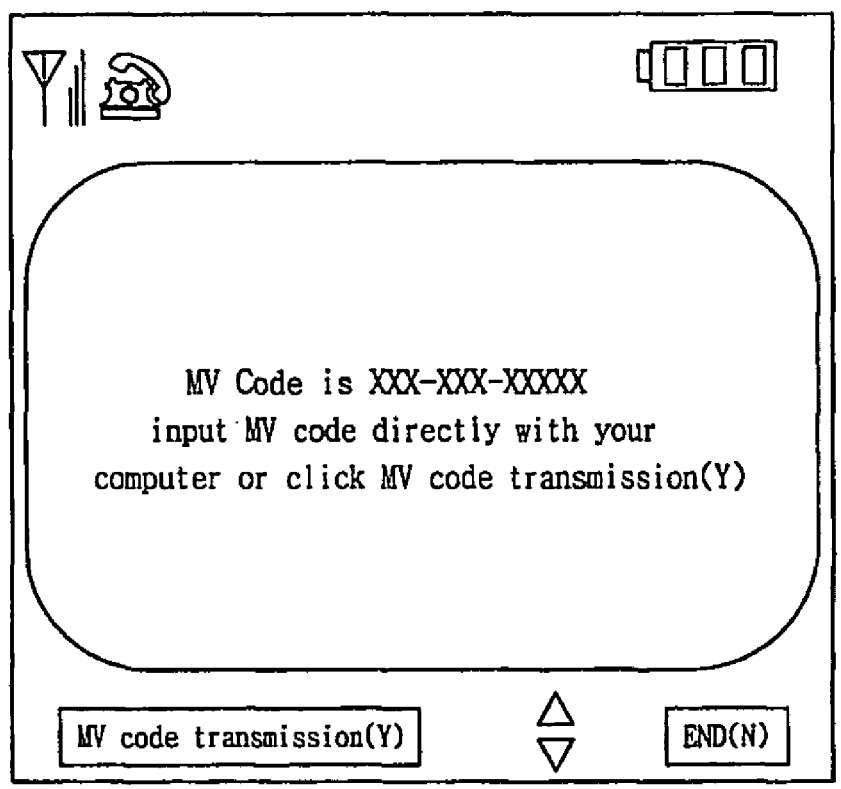

Further, if the user clicks a telephone field displayed under the electronic slip or the advertisement, a telephone window is displayed, as shown in FIG. 4e, thus enabling the mobile communication terminal of the user to be directly connected to the Internet or a corresponding telephone by the user clicking a MV code transmission field or buttons of his mobile communication terminal. Moreover, the display of the advertisement is ended by the user clicking an end field of the electronic slip.

On the other hand, for the electronic slip for payment approval, there are displayed a date, a serial number, titles of account of creditor and debtor, and transaction information by an automatic generation as shown in FIG. 4a, while for the electronic slip for transfer approval in delivery, there are displayed an enforcement date, a title of account and transaction information by an automatic generation as shown in FIG. 4b.

Figure 5A:
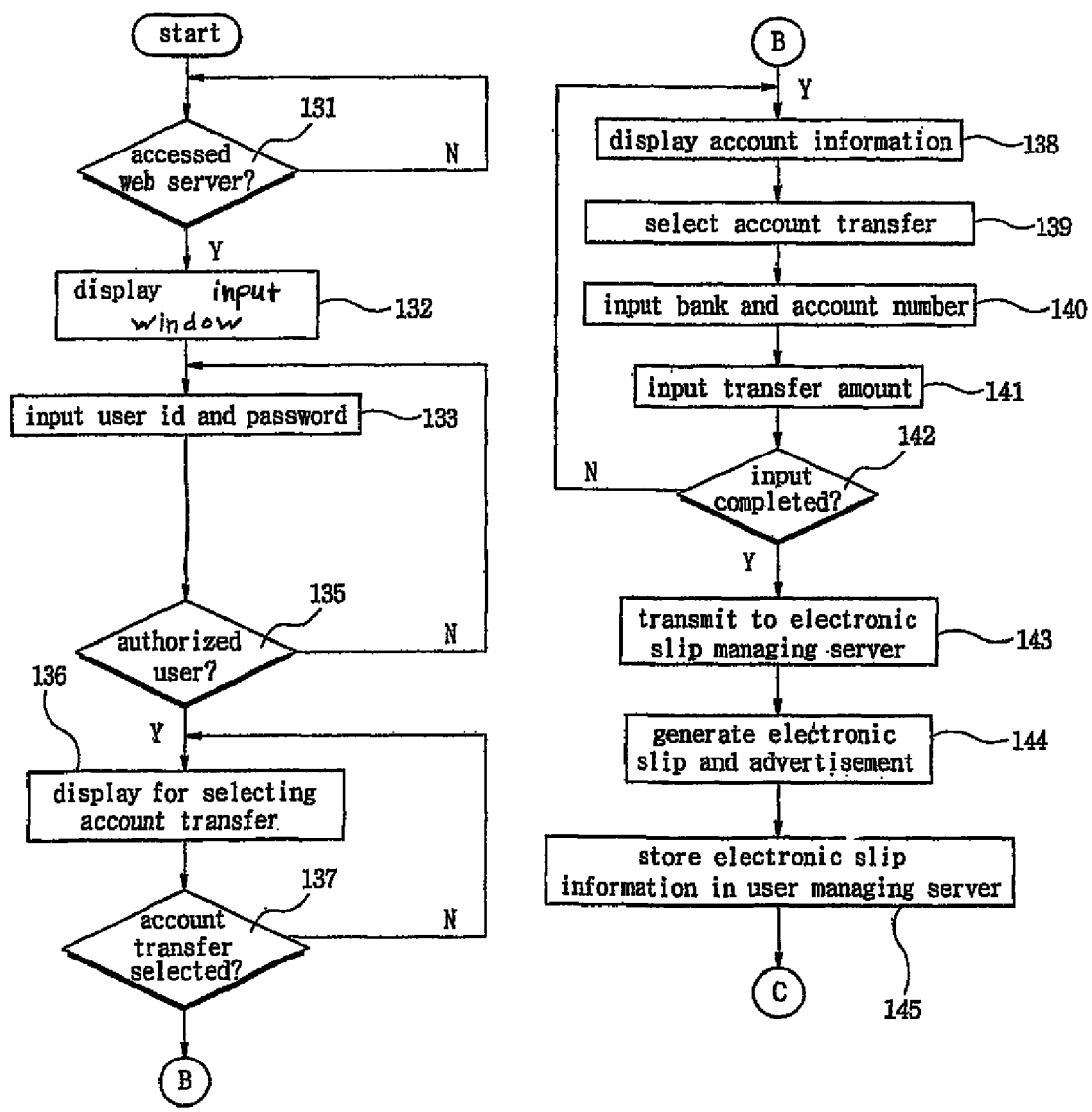
FIGS. 5a and 5b are flowcharts of a process of performing an account transfer service using the integrated account electronic financial transaction service of this invention.
Figure 5B:
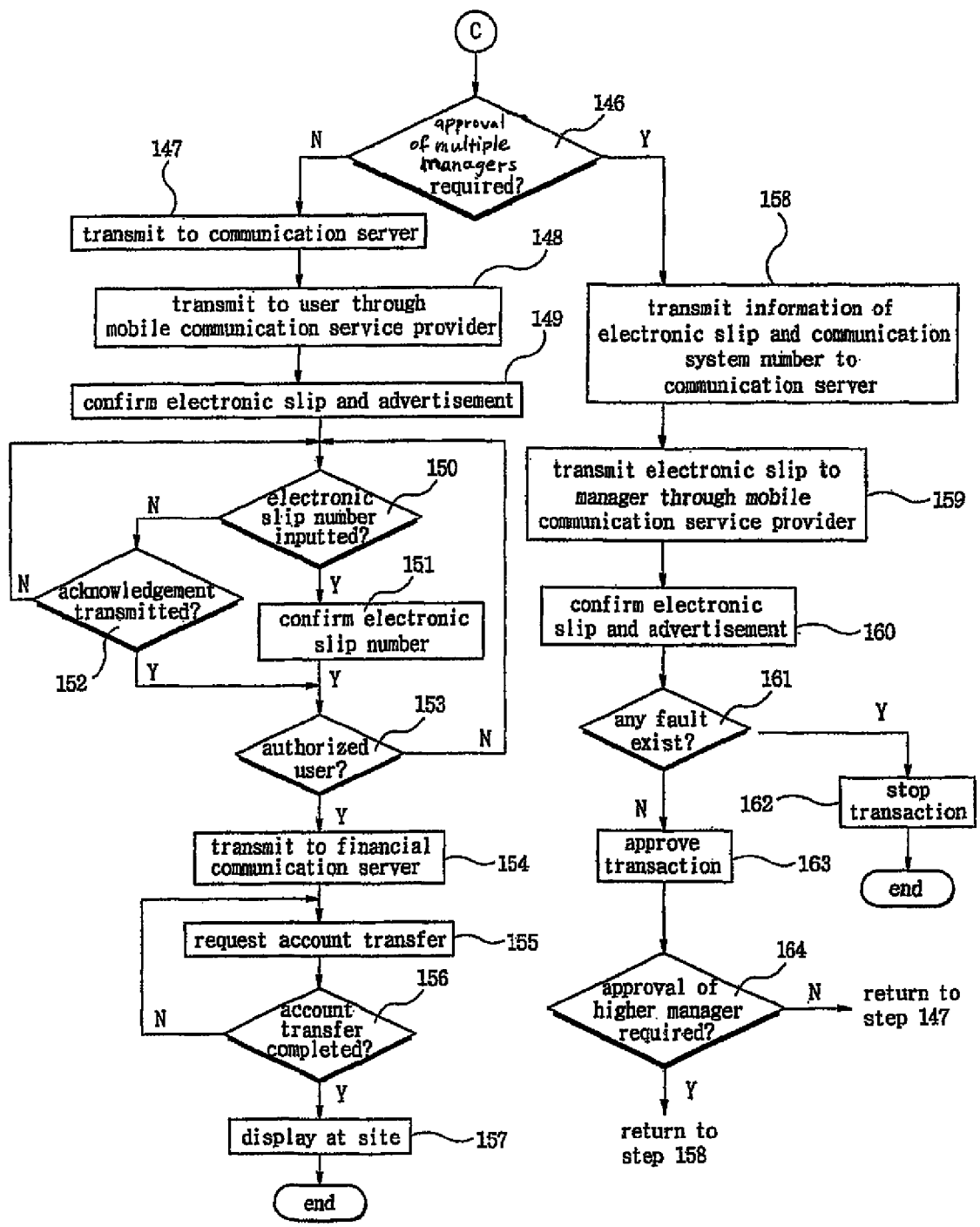

FIGS. 5a and 5b are flowcharts of a process of performing an account transfer service.

If, at step 131, the user accesses the Web server 1 and selects the website of an integrated account electronic financial transaction system, the Web server 1 displays an input window to the user using the short message service at step 132. The input window is the input window of FIG. 8 or the input window of FIG. 9. Information input to the input window of FIG. 8 is used to generate a personal electronic slip, and information input to the input window of FIG. 9 is used to generate an enterprise electronic slip. If the user inputs the user ID and password at step 133, it is determined whether the user is an authorized user at step 135.

If it is determined that the user is an authorized user at step 135, then at step 136 a Web site is displayed to allow the user to select and input a type of service in a of service selection field.

If the account transfer field is selected by the user at step 137, the account information of the user is displayed at the integrated account electronic financial transaction system website at step 138.

Accordingly, the Web server 1 displays transactable accounts of the user, such that, at step 139, the user selects an account from which to transfer money (which is required information), inputs a bank to which the amount is to be transferred (which is required input) and its account number at step 140, and inputs a transfer amount at step 141.

If the input process is completed at step 142, the Web server 1 transmits the information collected to the electronic slip managing server 11 at step 143. The electronic slip managing server 11, which receives the collected information, generates an electronic slip to which an electronic slip number is assigned and an advertisement at step 144 and stores the electronic slip information in the user managing server 2 at step 145.

At step 146, based on information in the electronic slip, the Web server 1 determines (on the basis of a payment limit amount) whether the transfer amount selected and inputted to the server by the user requires the approval of multiple managers. If multiple approvals are not required, the Web server 1 transmits both the electronic slip and the communication system number to the communication server 12 at step 147. The communication server 12 transmits the electronic slip to the user using the short message service through the mobile communication service provider 21 at step 148.

The user receiving the electronic slip confirms both the electronic slip contents and the advertisement at step 149. Then whether the electronic slip number has been inputted to the Web server 1 through the integrated account electronic financial transaction site is confirmed at step 150. If the electronic slip number has been inputted to the Web server 1, whether the electronic slip number inputted by the user is correct is checked at step 151.

If the electronic slip number is not inputted by the user, then at step 152, the Web server 1 confirms whether acknowledgement, which is a response method using WAP communication network of the mobile communication terminal, has been transmitted. If the acknowledgment has been transmitted, or if it is determined at step 151 that the electronic slip number input by the user is correct, then at step 153 it is determined whether the user is an authorized user. Then, the Web server 1, having confirmed that the user is authorized user transmits the contents of the account transfer to the financial communication server 4 at step 154. The financial communication server 4 requests the account transfer of a corresponding bank through the financial telecommunications and clearings institute 7 at step 55. At step 156, if the account transfer is completed, then the transferred result is displayed through the integrated account electronic financial transaction system website, thus allowing the user to confirm the transferred result at step 157.

If, at step 146, it is determined that the transfer amount requires the approval of multiple managers of the enterprise on the basis of the payment limit amount, then the enterprise manager clicks a "yes" field representing that additional transaction information will be inputted to the input window, and then the account transfer is performed after the contents of the account transfer are confirmed under the approval of multiple managers according to the accountant approval procedures of the enterprise.

Specifically, in order to make the manager of the enterprise confirm the contents of the account transfer, the user managing server 2 transmits the contents of the electronic slip and the communication system number of the manager to the communication server 12 at step 158. Then, the communication server 12 transmits the electronic slip to the manager using the short message service through the mobile communication service provider 21 at step 159.

After the manager receiving the electronic slip confirms both the contents of the electronic slip and the advertisement at step 160, if there is any fault in the contents at step 161, the enterprise manager stops the transaction at step 162. On the other hand, if there is no fault in the contents, the integrated account electronic financial transaction Web server 1 makes the WAP server (ARS server) 6 approve the transaction through the mobile communication service provider 21 at step 163.

It is confirmed whether the additional approval of another higher manager is required at step 164, and if the additional approval is required, the approval of the higher manager is achieved by the above procedures from steps 158 to 164. Meanwhile, if the additional approval is not required, the processing step returns to step 147 to identically execute the remaining steps.

Figure 6A:
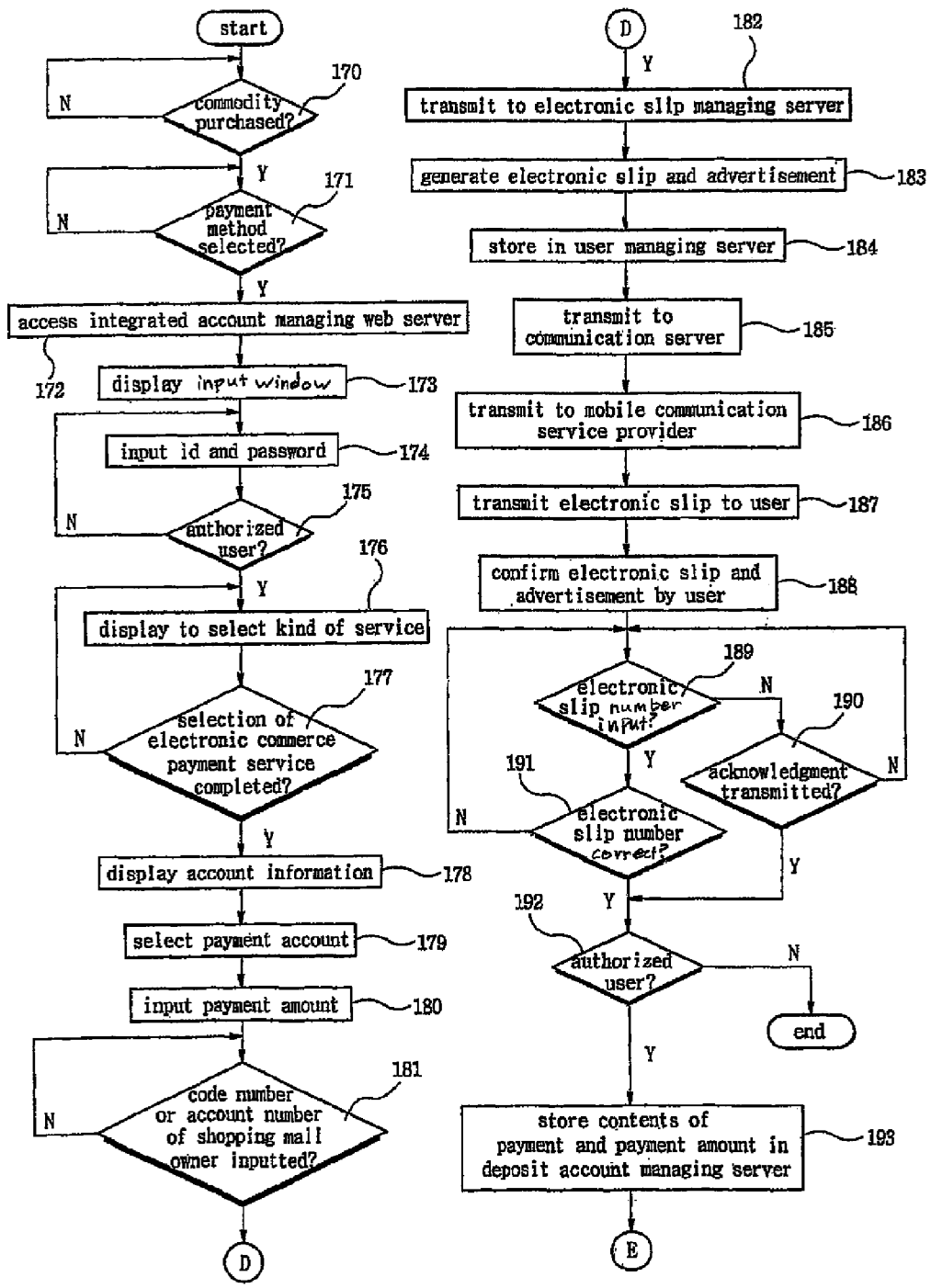
FIGS. 6a and 6b are flowcharts of a process of performing payment in an electronic commerce using the integrated account electronic financial transaction service of this invention.
Figure 6B:
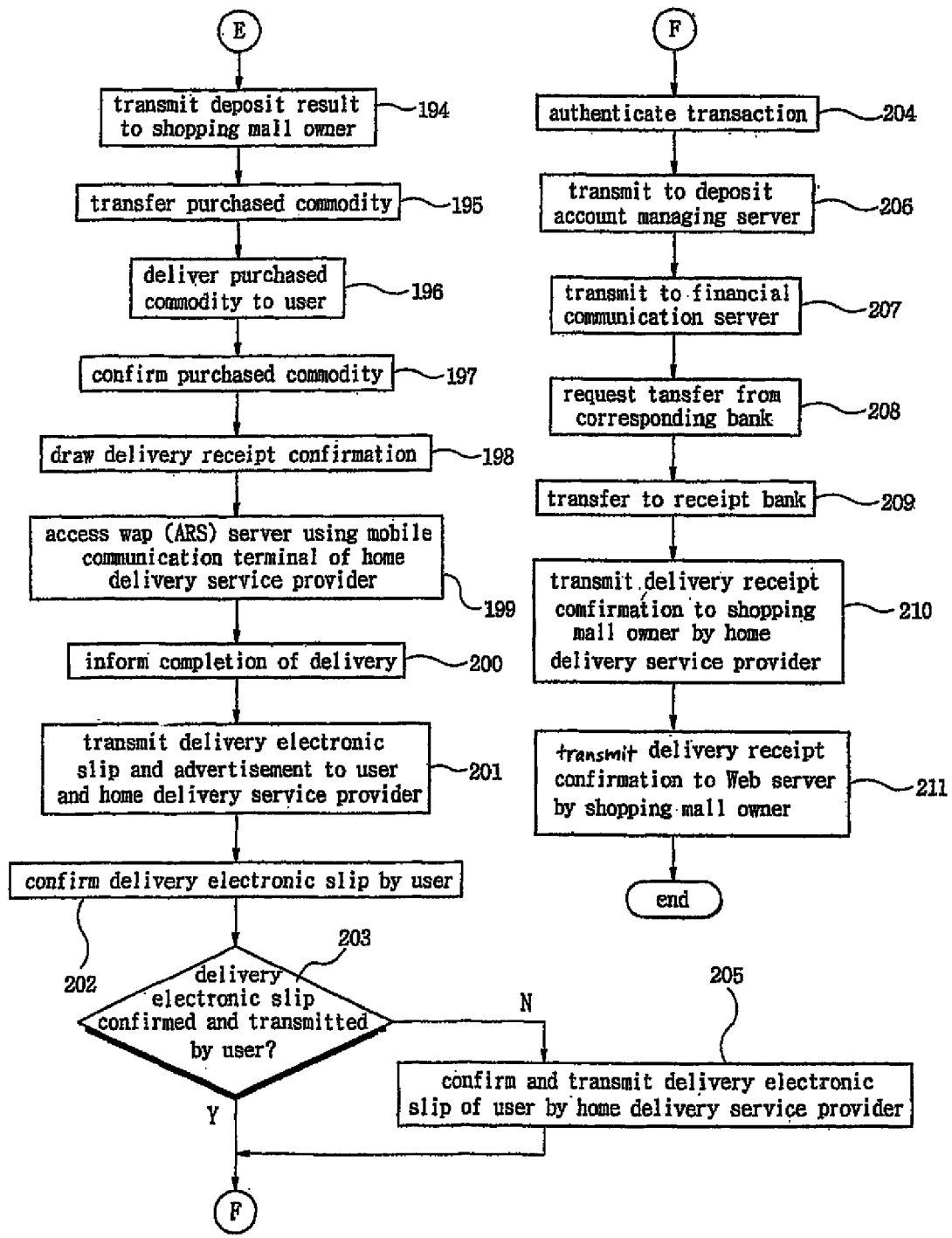

FIGS. 6*a* and 6*b* are flowcharts of a process of payment by the integrated account electronic financial transaction site in electronic commerce.

At step 170, the user purchases a commodity from the shopping mall owner 26 who sells commodities through television or Internet sites. Then, at step 171, if the user selects to pay through the integrated account electronic financial transaction Web server 1, the user's mobile communication terminal 22 is connected to the integrated account managing Web server 1 at step 172. At this time, an input window is displayed on a monitor of the user's mobile communication terminal 22 at step 173. Information input into the input widow is used to generate the personal electronic slip or the enterprise electronic slip.

At step 174, the user inputs the user ID and password to the input window. If the user is confirmed as an authorized user at step 175, then the user selects a kind of service at step 176.

If the user selects an electronic commerce payment service of a variety of services at step 177, the integrated account electronic financial transaction Web server 1 displays account information of the user at a corresponding site at step 178. The user as a purchaser selects a payment account at step 179, and inputs the payment amount at step 180.

Then, if the user inputs the code number of the shopping mall owner or the account number of the affiliated store at step 18 the collected information is transmitted to the electronic slip managing server 11 at step 182. Then, at step 183, the electronic slip managing server 11 generates the electronic slip in which the electronic slip number is recorded and the advertisement, and stores them in the user managing server 2 at step 184.

The electronic slip managing server 11 transmit both the contents of the electronic slip and the communication system number of the user (e.g., the telephone number of the user's mobile communication terminal 22) to the communication server 12 at step 185, and the transmitted contents are sent to the mobile communication service provider 21 at step 186.

Then, the mobile communication service provider 21 transfers the electronic slip to the user at step 187. After the user receiving the electronic slip confirms the contents of the electronic slip and the advertisement at step 188, it is confirmed whether the user inputs the electronic slip number to the Web server 1 through the integrated account electronic financial transaction site at step 189. If the electronic slip number is inputted, then at step 191, it is checked whether the electronic slip number inputted by the user is correct.

If the user does not input the electronic slip number, it is checked whether the acknowledgment, which is a response method using WAP of the communication network of the mobile communication terminal, has been transmitted at step 190. If the acknowledgment has been transmitted, or if it is determined at step 191 that the electronic slip number input by the user is correct, then at step 192 it is confirmed whether the user is an authorized user.

The integrated account electronic financial transaction Web server 1 deposits the amount of money withdrawn from the payment account of the user, while storing the contents of payment in the deposit account managing server 5 at step 193. Further, the Web server 1 transmits the deposit result to the electronic commerce shopping mall owner at step 194, and after confirming the reception of the deposit result, the electronic commerce shopping mall owner delivers the purchased commodity to the user through the home delivery service provider at step 195.

The home delivery service provider delivers the purchased commodity to the user at step 196. The user checks the quality condition of the commodity at step 197, and if there is no fault in the commodity, the user draws the delivery receipt confirmation at step 198.

During the drawing of the delivery receipt confirmation by the user, the home delivery service provider accesses the mobile communication network using the WAP, and then accesses the WAP server (ARS server) 6 of the integrated account electronic financial transaction Web server 1 at step 199 to inform the WAP server of the completion of the delivery at step 200.

The Web server 1 confirms the delivery completion result and transmits a delivery electronic slip and an advertisement to both the user and the home delivery service provider using the short message service at step 201. The user confirms the received delivery electronic slip through the user's mobile communication terminal 22 at step 202, and then transmits the electronic slip number using WAP at step 203, thus enabling the transaction to be authenticated at step 204.

If the user does not transmit the electronic slip number, the home delivery service provider confirms and transmits the delivery electronic slip of the user to the WAP server 6 through the mobile communication network at step 205, such that the authentication procedure can be performed at step 204.

Here, a code number is omitted in the electronic slip transmitted to the home delivery service provider and is transferred from the user receiving the electronic slip in which the code number is recorded, such that the authentication can be achieved only after the commodity is delivered normally to the user.

The authenticated transaction contents are confirmed by informing the deposit account managing server 5 of the contents of a corresponding transaction by the WAP server (ARS server) 6 at step 206.

If the confirmation of the delivery receipt is completed, information on the deposit amount and the payment account is transmitted to the financial communication server 4 at step 207. The deposit account managing server 5 requests the account transfer of a corresponding bank at step 208, such that the payment amount is transferred from the corresponding bank to a bank having a receipt account at step 209.

The home delivery service provider transmits the delivery receipt confirmation to the electronic commerce shopping mall owner at step 210, and the electronic commerce shopping mall owner transmits the delivery receipt confirmation to the integrated account electronic financial transaction Web server 1 at step 211.

Figure 7A:
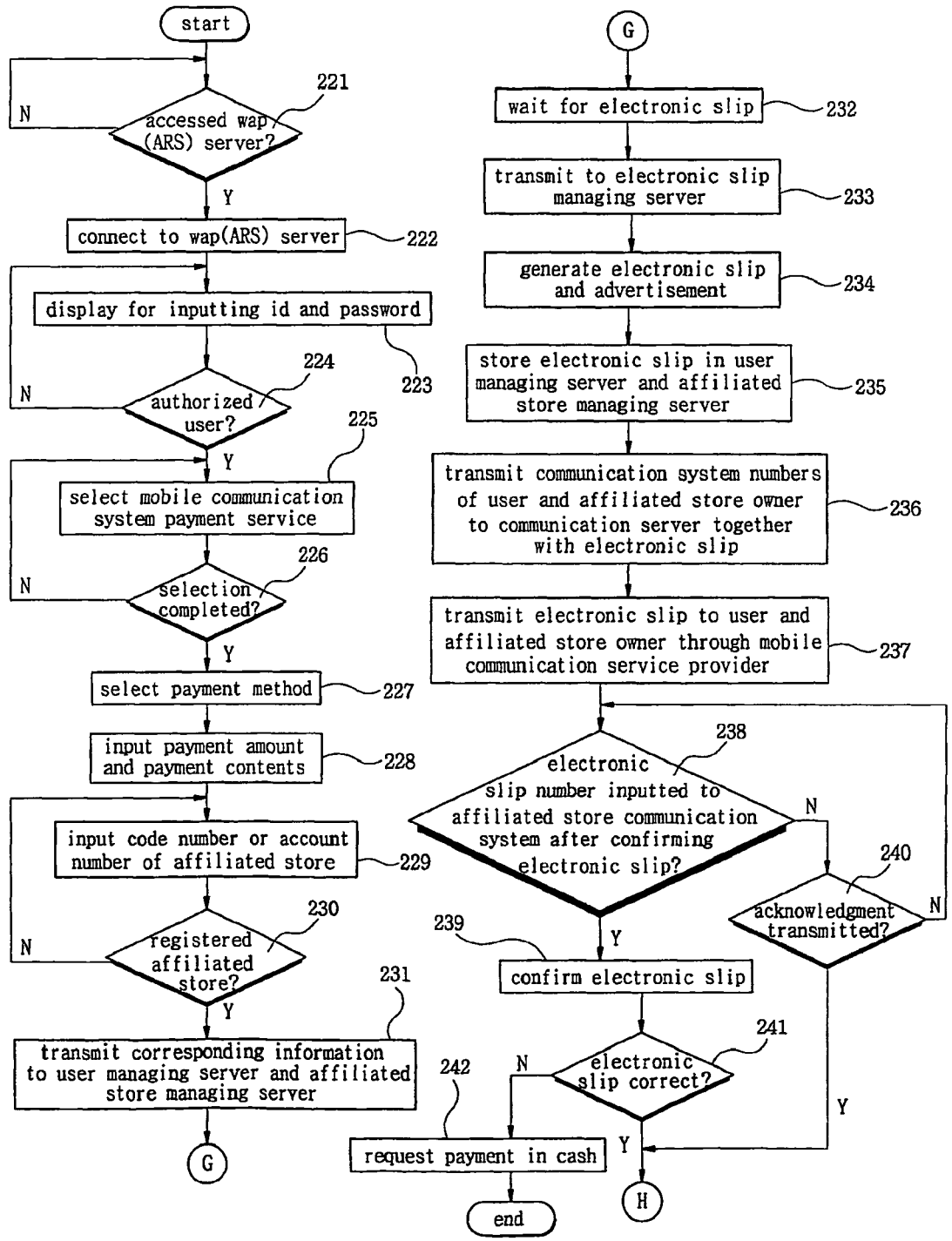
FIGS. 7a and 7b are flowcharts of a process of performing payment using the integrated account electronic financial transaction service and mobile communication systems of this invention.
Figure 7B:
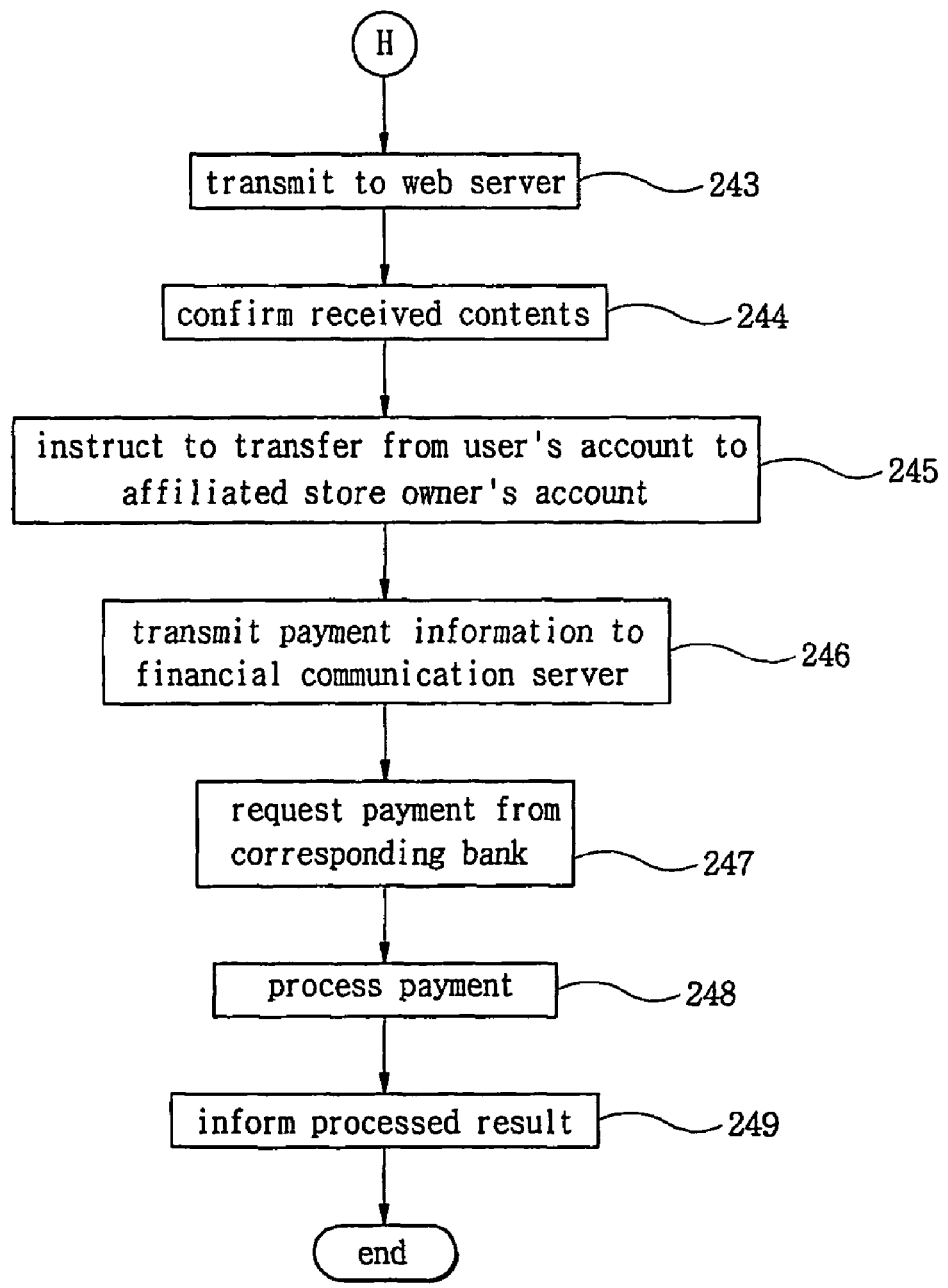

FIGS. 7*a* and 7*b* are flowcharts of a process of payment using the user's mobile communication terminal 22 when the user purchases a commodity, has a dinner in a restaurant and uses various services.

First, if the user accesses the WAP server (or ARS server) 6 through the integrated account electronic financial transaction system Web server 1 using the user's mobile communication terminal 22 at step 221, the communication system of the user is connected to the WAP server (ARS server) 6 at step 222. An input window is displayed at step 223 to allow the user to input his ID and password. The information input is either the input window shown in FIG. 8 or the input window shown in FIG. 9. Information input into the input window of FIG. 8 is used to generate a personal electronic slip and information input into the input window of FIG. 9 is used to generate an enterprise electronic slip.

Therefore, the WAP server (ARS server) 6 confirms whether the user is an authorized user through the user managing server 2 at step 224, and if it is confirmed that the user is an authorized user, the WAP server 6 makes the user select and input mobile communication system payment as the type of service at step 225.

If the selection is performed at step 226, the user selects the payment method at step 227, and inputs the payment amount and the payment contents at step 228.

The payment contents include affiliated store codes of affiliated store owners, which provide services like a food service, a television home shopping, and a communication catalog sales service, and commodity order codes.

Next, the user inputs an affiliated store code or an account number to which the amount is paid at step 229, and the affiliated store managing server 3 confirms whether the inputted code is that of the registered affiliated store at step 230.

If the inputted code is that of the registered affiliated store according to the confirmation result, the WAP (ARS) server 6 transmits the information on the payment account and payment amount to both the user managing server 2 and the affiliated store managing server 3 at step 231

If the user is disconnected from the WAP server 6 to wait for an electronic slip at step 232, the inputted information is transmitted to the electronic slip managing server 11 at step 233. The electronic slip managing server 11 generates an electronic slip, in which an electronic slip number is recorded, and an advertisement at step 234, and the electronic slip with the electronic slip number is stored in the user managing server 2 and the affiliated store managing server 3 at step 235.

The communication system numbers of both the user's mobile communication terminal 22 and the communication terminal 25 of the affiliated store owner are transferred to the communication server 12 together with the electronic slip at step 236. The communication server 12 transmits the electronic slip to both the user's mobile communication terminal 22 and the communication terminal 25 of the affiliated store owner 25 using SMS through the mobile communication service provider 21 at step 237.

Here, a code number is omitted in the electronic slip transmitted to the affiliated store owner and is transferred from a user receiving the electronic slip in which the code number is recorded, thus enabling the authentication to be performed only after a normal transaction is accomplished.

If the user informs the affiliated store of the electronic slip number, the affiliated store confirms the electronic slip by a slip number confirmation program and then inputs the electronic slip number to the affiliated store communication system at step 238, such that it is confirmed whether the electronic slip number is correct at step 239.

If the electronic slip number is not inputted at step 238, it is confirmed whether the user has transmitted an acknowledgment through the mobile communication terminal using WAP at step 240.

If the electronic slip is not correct at step 241, the affiliated store requests a payment in cash and ends the payment process at step 242. On the other hand, if the electronic slip number is correct or the acknowledgment has been transmitted (step 240), the affiliated store transmits the acknowledgment result to the integrated account electronic financial transaction Web server 1 through the communication system at step 243. The communication server 12 confirms the received contents at step 244, and then instructs the transfer of the payment amount from the user's account to the affiliated store owner's account at step 245.

The integrated account electronic financial transaction Web server 1 transfers the payment information to the financial communication server 4 at step 246, and the financial communication server 4 requests the payment from a corresponding bank at step 247. The corresponding bank pays the amount of money to a receipt bank by money transfer at step 248, and then transfers the paid result to the integrated account electronic financial transaction Web server 1 to inform the user and the affiliated store of the paid result at step 249.

The payment is described only for an example of payment by cash or debit card; however, if the user desires to pay by his credit card, authentication by the electronic slip is performed, and then the payment is processed in connection with typical credit card payment systems.

INDUSTRIAL APPLICABILITY

As described above, the present invention provides an electronic financial transaction system and method of providing a real-time authentication service through a wire/wireless communication network, which has an electronic slip function connected to a mobile communication system, thus allowing electronic financial transaction users to perform electronic financial transactions safely, conveniently, and rapidly by securing and authenticating the electronic financial transaction in real time through the electronic slip without temporal and spatial restrictions. Further, an approval authority (user) can approve payments in real time without temporal and spatial restrictions, so a leakage of information, or diversion and misappropriation of money can be prevented.

Further, the present invention is advantageous in that flows of commodity purchase and delivery are achieved in electronic commerce such that a conventional method such as payment in advance and deferred commodity confirmation can be changed to a method such as deferred payment and commodity confirmation in advance using electronic slips connected to a mobile communication system, thus increasing mutual reliability between users and electronic commerce shopping mall owners to activate the electronic commerce.

Further, the present invention is advantageous in that, since typical transaction amounts of money can be paid using mobile communication systems, a mobile communication terminal can be used as cash within a limited amount of money (including the credit transaction amount) of a user account. Further, since the user does not need to carry cash, the present invention can provide convenience and safety. Moreover, financial losses due to the leakage of personal information of the user can be prevented, and transaction and payment can be carried out in a timely manner in a viewpoint of the affiliated store owner, thereby increasing commercial transactions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A system providing an electronic financial transaction, the system comprising:
   an integrated account electronic financial transaction system comprising a web server, a user managing server, a financial communication server, and a bank terminal;
   a user's mobile communication terminal; and
   an electronic slip processor receiving electronic financial transaction request information from the user through the integrated account electronic financial transaction system, and providing an electronic slip including an electronic slip number to the user's mobile communication terminal,
   wherein the web server, in response to receiving the electronic slip number from the user, accesses the bank terminal through the financial communication server in accordance with the electronic financial transaction request information,
   wherein, in response to receiving the electronic financial transaction request information, the electronic slip processor generates the electronic slip including the electronic slip number and stores the generated electronic slip including the electronic slip number in a database, and
   wherein the bank terminal is accessed through the financial communication server in accordance with the electronic financial transaction request after a determination is made that, based on the received electronic slip number, the user is authorized.

2. The system of claim 1, wherein the electronic slip processor comprises:
   an electronic slip managing server; and
   a communication server receiving the electronic slip from the electronic slip managing server and providing the electronic slip to the user's mobile communication terminal.

3. The system of claim 1, wherein the web server displays an input window to the user;
   wherein the user inputs information into the input window; and
   wherein the web server provides the information input into the input window to the electronic slip processor.

4. The system of claim 1, wherein, if the user has selected an account information mode as a service type, the web server receives account information corresponding to the user from the bank terminal and displays the account information to the user.

5. The system of claim 1, wherein, if the user has selected account transfer as a service type, the web server provides information regarding an account transfer to the financial communication server, and the financial communication server requests the account transfer through a financial telecommunications and clearings institute of the integrated account electronic financial transaction system.

6. The system of claim 1, wherein, if the user has selected electronic commerce payment as a service type, the web server deposits money withdrawn from a payment account of the user in a deposit account of the integrated account electronic financial transaction system, and stores information about the electronic commerce payment in a deposit account managing server of the integrated account electronic financial transaction system.

7. The system of claim 1, wherein the electronic slip processor provides an advertisement to the mobile communication terminal of the user with the electronic slip.

8. The system of claim 1, wherein the database is located in the electronic slip processor.

9. A system providing an electronic financial transaction, the system comprising:
   an integrated account electronic financial transaction system comprising a web server, a user managing server, a financial communication server, and a bank terminal;
   a user's mobile communication terminal; and
   an electronic slip processor receiving electronic financial transaction request information from the user through the integrated account electronic financial transaction system, and providing an electronic slip including an electronic slip number to the user's mobile communication terminal,
   wherein, in response to an acknowledgement being provided using a wireless application protocol (WAP) server, the web server accesses the bank terminal through the financial communication server in accordance with the electronic financial transaction request,
   wherein, in response to receiving the electronic financial transaction request information, the electronic slip processor generates the electronic slip including the electronic slip number and stores the generated electronic slip including the electronic slip number in a database, and
   wherein the bank terminal is accessed through the financial communication server in accordance with the electronic financial transaction request after a determination is made that, based on the received acknowledgement, the user is authorized.

10. The system of claim 9, wherein the electronic slip processor comprises:
    an electronic slip managing server; and
    a communication server receiving the electronic slip from the electronic slip managing server and providing the electronic slip to the user's mobile communication terminal.

11. The system of claim 9, wherein the web server displays an input window to the user;
    wherein the user inputs information into the input window; and
    wherein the web server provides the information input into the input window to the electronic slip processor.

12. The system of claim 9, wherein, if the user has selected an account information mode as a service type, the web server receives account information corresponding to the user from the bank terminal and displays the account information to the user.

13. The system of claim 9, wherein, if the user has selected account transfer as a service type, the web server provides information regarding an account transfer to the financial communication server, and the financial communication server requests the account transfer through a financial telecommunications and clearings institute of the integrated account electronic financial transaction system.

14. The system of claim 9, wherein, if the user has selected electronic commerce payment as a service type, the web server deposits money withdrawn from a payment account of the user in a deposit account of the integrated account electronic financial transaction system, and stores information about the electronic commerce payment in a deposit account managing server of the integrated account electronic financial transaction system.

15. The system of claim 9, wherein the electronic slip processor provides an advertisement to the mobile communication terminal of the user with the electronic slip.

16. The system of claim 9, wherein the database is located in the electronic slip processor.

17. A method for performing an electronic financial transaction, the method comprising:

providing electronic financial transaction request information from a user to an electronic slip processor through an integrated account electronic financial transaction system, wherein the integrated account electronic financial transaction system comprises a web server, a user managing server, a financial communication server, and a bank terminal;

providing an electronic slip including an electronic slip number from the electronic slip processor to a mobile communication terminal of the user;

in response to receiving the electronic slip number from the user, accessing the bank terminal through the financial communication server in accordance with the electronic financial transaction request;

in response to receiving the electronic financial transaction request information, generating the electronic slip including the electronic slip number; and storing the generated electronic slip including the electronic slip number in a database, and wherein, the accessing of the bank terminal through the financial communication server in accordance with the electronic financial transaction request, in response to the receiving of the electronic slip number from the user, comprises:

in response to receiving the electronic slip number from the user, determining if the user is authorized based on the received the electronic slip number; and if the user is authorized, accessing the bank terminal through the financial communication server in accordance with the electronic financial transaction request.

18. The method of claim 17, further comprising:
selecting account information mode as a service type;
retrieving account information from the bank terminal; and
displaying the account information to the user.

19. The method of claim 17, further comprising:
selecting account transfer as a service type;
inputting an amount of an account transfer;
determining whether the amount of the account transfer requires the approval of multiple managers; and
requesting the account transfer, wherein the account transfer involves the bank terminal.

20. The method of claim 17, further comprising:
selecting a mobile communication system payment as a service type;
selecting a payment account;
inputting a payment amount;
withdrawing the payment amount from the payment account;
depositing the withdrawn payment amount in a deposit account of the integrated account electronic financial transaction system;
delivering a purchased commodity to the user after withdrawing the payment amount from the payment account; and
transferring the payment amount to a receipt account after delivering the purchased commodity.

21. The method of claim 17, further comprising:
providing an advertisement with the electronic slip from the electronic slip processor to the mobile communication terminal of the user.

22. The method of claim 17, wherein the database is located in the electronic slip processor.

* * * * *